US012626595B2

(12) United States Patent
Kasaura

(10) Patent No.: US 12,626,595 B2
(45) Date of Patent: May 12, 2026

(54) COLLISION CONDITION APPLICATION DEVICE, METHOD, PROGRAM AND PATH GENERATION DEVICE

(71) Applicant: OMRON Corporation, Kyoto (JP)

(72) Inventor: Kazumi Kasaura, Tokyo (JP)

(73) Assignee: OMRON Corporation, Kyoto (JP)

( * ) Notice: Subject to any disclaimer, the term of this patent is extended or adjusted under 35 U.S.C. 154(b) by 236 days.

(21) Appl. No.: 18/228,407

(22) Filed: Jul. 31, 2023

(65) Prior Publication Data

US 2024/0054898 A1 Feb. 15, 2024

(30) Foreign Application Priority Data

Aug. 9, 2022 (JP) ................................ 2022-127476

(51) Int. Cl.

*G08G 1/00* (2006.01)
*G08G 1/01* (2006.01)
*G08G 1/16* (2006.01)

(52) U.S. Cl.

CPC ............ *G08G 1/163* (2013.01); *G08G 1/012* (2013.01)

(58) Field of Classification Search

None
See application file for complete search history.

(56) References Cited

U.S. PATENT DOCUMENTS

2020/0293063 A1 9/2020 Aisu
2022/0169244 A1* 6/2022 Sun .................. B60W 50/0097
2025/0249586 A1* 8/2025 Murray ................. B25J 9/1664

FOREIGN PATENT DOCUMENTS

JP H10-312217 A 11/1998
JP 2020-149370 A 9/2020

OTHER PUBLICATIONS

Phillips et al., "SIPP: Safe Interval Path Planning for Dynamic Environments," Computer Science IEEE International Conference on Robotics and Automation (2011).
Kasaura et al., "Prioritized Safe Interval Path Planning for Multi-Agent Pathfinding with Continuous Time on 2D Roadmaps," IEEE Robotics and Automation Letters, 7 (4): 10494-10501 (2022).

* cited by examiner

*Primary Examiner* — James M McPherson
(74) *Attorney, Agent, or Firm* — Morgan, Lewis & Bockius LLP

(57) ABSTRACT

The present disclosure provides an extraction unit that extracts, in a case in which plural agents move on a road map including plural vertices and plural edges connecting the vertices, a vertex-edge pair and an edge-edge pair in which the agents are likely to collide with each other; a calculation unit that calculates a time interval in which a collision between both agents occurs; and an application unit that applies collision condition information.

7 Claims, 14 Drawing Sheets

FIG.4

40

42

| VERTEX ID | POSITION INFORMATION |
|---|---|
| V1 | (x1, y1) |
| V2 | (x2, y2) |
| ... | |

44

| EDGE ID | END POINT |
|---|---|
| E1 | V1-V3 |
| E2 | V2-V4 |
| ... | |

FIG.8

| AGENT ID | PATH |
|---|---|
| A1 | (V1, τ11), (V3, τ12), (V7, τ13), ··· |
| A2 | (V2, τ21), (V4, τ22), (V9, τ23), ··· |
| ··· | |

COLLISION CONDITION APPLICATION DEVICE, METHOD, PROGRAM AND PATH GENERATION DEVICE

CROSS-REFERENCE TO RELATED APPLICATION

This application is based on and claims the benefit of priority of the prior Japanese Patent Application No. 2022-127476, filed on Aug. 9, 2022, the entire contents of which are incorporated herein by reference.

BACKGROUND

Technical Field

The present disclosure relates to a collision condition application device, a collision condition application method, a collision condition application program, and a path generation device.

Related Art

A problem of searching for paths in which a plurality of agents having a size move from respective start points to respective target points without colliding with each other in one environment is referred to as multi-agent path finding (MAPF). In a general MAPF problem, the movement of each agent is determined under discrete time on a grid graph or road map representing a path along which the agent can move within the environment.

As a technology related to the MAPF problem, for example, an operation management control device that plans an operation and a path for efficiently moving a plurality of unmanned vehicles to a destination node in consideration of conflict of traveling paths and adjacent nodes is proposed (Japanese Patent Application Laid-Open (JP-A) No. H10-312217). In this device, the movement path and the node reservation sequence of each unmanned vehicle, the position and the conveyance destination of the conveyance object, the current position and the movement direction of each unmanned vehicle, the coordinates of each node on the traveling path, the connection relationship and the cost, and the Petri net model data are stored in a memory. This device determines an optimal travel path and an operation order of the unmanned vehicle by using the information stored in the memory.

For example, a flight plan system that makes an operation plan for a plurality of moving bodies traveling in a traveling path network including a plurality of traveling paths is proposed (Japanese Patent Application Laid-Open (JP-A) No. 2020-149370). This system generates a plurality of travel timing plans in which timings at which the plurality of moving bodies travel on a traveling path are designated such that a conflict between the moving bodies does not occur on the traveling path based on position information of the plurality of moving bodies, traveling path structure information representing a structure of the traveling path network, and a plurality of path plans in which an order of one or more designated areas through which the plurality of moving bodies pass is designated for the plurality of designated areas in the traveling path network.

For a single agent, a method referred to as safe interval path planning (SIPP) in which a path search in a case in which there is a moving obstacle is performed under continuous time is proposed (Mike Phillips and Maxim Likhachev, "SIPP: Safe Interval PathPlanning for Dynamic Environments", Computer Science 2011 IEEE International Conference on Robotics and Automation, 9 May 2011).

SUMMARY OF THE INVENTION

However, in a case in which the movement of each agent is determined under discrete time, the time is divided into turns common to all the agents, and the action of the agent is determined for each turn. As a result, there is a problem that there is a case in which the limitation for avoiding a collision between the agents increases, and the path search becomes difficult.

It is also conceivable to extend the MAPF problem in the case of continuous time by combining the MAPF problem in discrete time with a method of dealing with continuous time such as SIPP. However, in a case in which the SIPP is applied to a road map that is a non-grid graph, determining the collision between the agents becomes a bottleneck in calculation. This is because, in order to apply the SIPP, it is necessary to grasp in advance when and where a collision with all moving obstacles on the road map may occur. Therefore, in the case of the multi-agent, the paths of the agents are determined one by one in some priority order. In this case, when the number of agents increases, enormous calculation is required, and thus it becomes difficult to generate a path of each agent, which is a solution to the MAPF problem, in a realistic time.

The disclosure has been made in view of the above points, and an object thereof is to enable path generation in continuous time of a multi-agent on a road map in a short period of time.

In order to achieve the object, a collision condition application device according to the disclosure includes: an extraction unit that, in a case in which a plurality of agents move on a road map including a plurality of vertices and a plurality of edges connecting the plurality of vertices, extracts a first pair of vertices and edges for which there is a possibility of agents being present at the vertices or agents moving on the edges colliding with each other and a second pair of one edge and another edge for which there is a possibility of the agents colliding with each other; a calculation unit that calculates, with respect to a difference between a time at which one agent is present at a vertex of each of respective first pairs of vertices and a time at which another agent starts to move from an end point of an edge and a difference between a time at which one agent starts to move from an end point of the one edge of each of respective second pairs and a time at which another agent starts to move from an end point of the other edge, a time interval in which a collision between the one agent and the other agent occurs; and an application unit that applies, to the road map, information obtained by associating identification information of the vertex and the edge included in the first pair with the time interval and information obtained by associating identification information of each of the two edges included in the second pair with the time interval, as a condition in which a collision between the agents occurs.

The extraction unit may extract the first pair and the second pair from the plurality of vertices and the plurality of edges included in the road map by using an algorithm that lists pairs of points of which inter-point distances are a certain distance or shorter in a given set of points, an algorithm that lists points present in a given area in a given set of points, and an algorithm that lists pairs of line segments intersecting with each other in a given set of line segments.

In a case in which an agent is assumed to be a circle having a diameter of a predetermined value, the extraction unit may extract, as the first pair, a pair of a vertex and an edge that satisfies at least one of a case in which a distance between at least one of end points of the edge and the vertex is less than the predetermined value or a case in which a length of a perpendicular line drawn from the vertex to the edge is less than the predetermined value, from the plurality of vertices and the plurality of edges included in the road map; and extract, as the second pair, a pair of edges that satisfies at least one of a case in which a distance between at least one of end points of one edge and another edge is less than the predetermined value or a case in which the edges intersect with each other, from the plurality of vertices and the plurality of edges included in the road map.

In order to achieve the object, a path generation device according to the disclosure includes: above-the collision condition application device; and a generation unit that generates a path of each of a plurality of agents moving on the road map to which a condition in which the plurality of agents collide with each other is applied by the collision condition application device, in which a time at which an agent is present at a vertex included in the path and a time at which the agent starts to move from an end point of an edge are not included in a time interval of the condition.

In a case in which paths of the plurality of agents are sequentially generated one by one, the generation unit may generate a path of a first agent and then generate a path so that, in a case in which a path of a second agent is generated, at time at which a difference between a time at which the agent is present at a vertex included in the path generated for the first agent and time at which the agent starts to move from an end point of the edge is not included in the time interval, the second agent is present at the vertex or starts to move from the end point of the edge.

In order to achieve the object, a collision condition application method according to the disclosure includes: in a case in which a plurality of agents move on a road map including a plurality of vertices and a plurality of edges connecting the plurality of vertices, extracting a first pair of vertices and edges for which there is a possibility of agents being present at the vertices or agents moving on the edges colliding with each other and a second pair of one edge and another edge for which the there is a possibility of agents are colliding with each other, by an extraction unit; calculating, with respect to a difference between a time at which one agent is present at a vertex of each of respective first pairs of vertices and a time at which another agent starts to move from an end point of an edge and a difference between a time at which one agent starts to move from an end point of the one edge of each of respective second pairs and a time at which another agent starts to move from an end point of the other edge, a time interval in which a collision between the one agent and the other agent occurs, by a calculation unit; and applying, to the road map, information obtained by associating identification information of the vertices and the edges included in the first pair with the time interval and information obtained by associating identification information of each of two edges included in the second pair with the time interval, as a condition in which a collision between agents occurs, by an application unit.

In order to achieve the object, a collision condition application program according to the disclosure causes a computer to function as: an extraction unit that, in a case in which a plurality of agents move on a road map including a plurality of vertices and a plurality of edges connecting the plurality of vertices, extracts a first pair of vertices and edges for which there is a possibility of agents being present at the vertices or agents moving on the edges colliding with each other and a second pair of one edge and another edge for which there is a possibility of the agents colliding with each other; a calculation unit that calculates, with respect to a difference between a time at which one agent is present at a vertex of each of respective first pairs of vertices and a time at which another agent starts to move from an end point of an edge and a difference between a time at which one agent starts to move from an end point of the one edge of each of respective second pairs and a time at which another agent starts to move from an end point of the other edge, a time interval in which a collision between the one agent and the other agent occurs; and an application unit that applies, to the road map, information obtained by associating identification information of the vertices and the edges included in the first pair with the time interval, and information obtained by associating identification information of each of two edges included in the second pair with the time interval, as a condition in which a collision between agents occurs.

According to the collision condition application device, the method, the program, and the path generation device according to the disclosure, it is possible to generate a path in continuous time of a multi-agent on a road map in a short period of time.

BRIEF DESCRIPTION OF THE DRAWINGS

FIG. 4 is a diagram illustrating an example of a data configuration of the road map.

FIG. 8 is a diagram illustrating an example of a generated path.

DETAILED DESCRIPTION OF THE INVENTION

Figure 1:
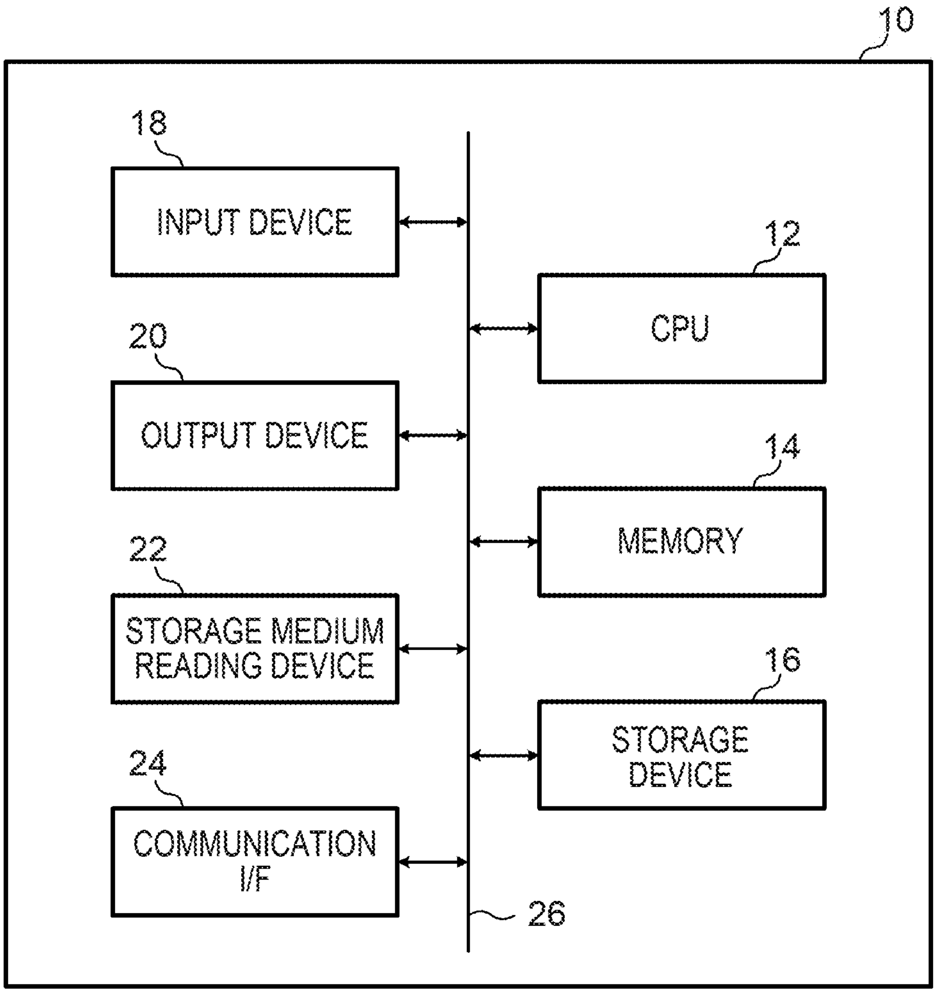
FIG. 1 is a block diagram illustrating a hardware configuration of a path generation device.

Hereinafter, an example of an embodiment of the disclosure is described with reference to the drawings. In each drawing, the same or equivalent components and portions are denoted by the same reference numerals. Dimensions and ratios of the drawings are exaggerated for convenience of description and may be different from actual ratios.

FIG. 1 is a block diagram illustrating a hardware configuration of a path generation device 10 according to the present embodiment. As illustrated in FIG. 1, the path generation device 10 includes a central processing unit (CPU) 12, a memory 14, a storage device 16, an input device 18, an output device 20, a storage medium reading device 22, and a communication interface (I/F) 24. The respective components are communicably connected to each other via a bus 26.

The storage device 16 stores a path generation program for performing a collision condition application process and a path generation process described below. The CPU 12 is a central processing unit, and executes various programs and controls the respective components. That is, the CPU 12 reads the program from the storage device 16 and executes the program using the memory 14 as a work area. The CPU 12 performs control of the respective components and various types of arithmetic processing according to the program stored in the storage device 16.

The memory 14 includes a random access memory (RAM) and temporarily stores the program and data as a work area. The storage device 16 includes a read only memory (ROM), a hard disk drive (HDD), a solid state drive (SSD), and the like and stores various programs including an operating system and various kinds of data.

The input device 18 is a device for performing various inputs, such as a keyboard and a mouse. The output device 20 is a device for outputting various kinds of information, such as a display and a printer. A touch panel display may be employed as the output device 20 to function as the input device 18. The storage medium reading device 22, for example, reads data stored in various storage media such as a compact disc (CD)-ROM, a digital versatile disc (DVD)-ROM, a Blu-ray disc, and a universal serial bus (USB) memory, and writes data to the storage medium. The communication I/F 24 is an interface for communicating with other devices and, for example, standards such as Ethernet (registered trademark), FDDI, and Wi-Fi (registered trademark) are used.

Figure 2:
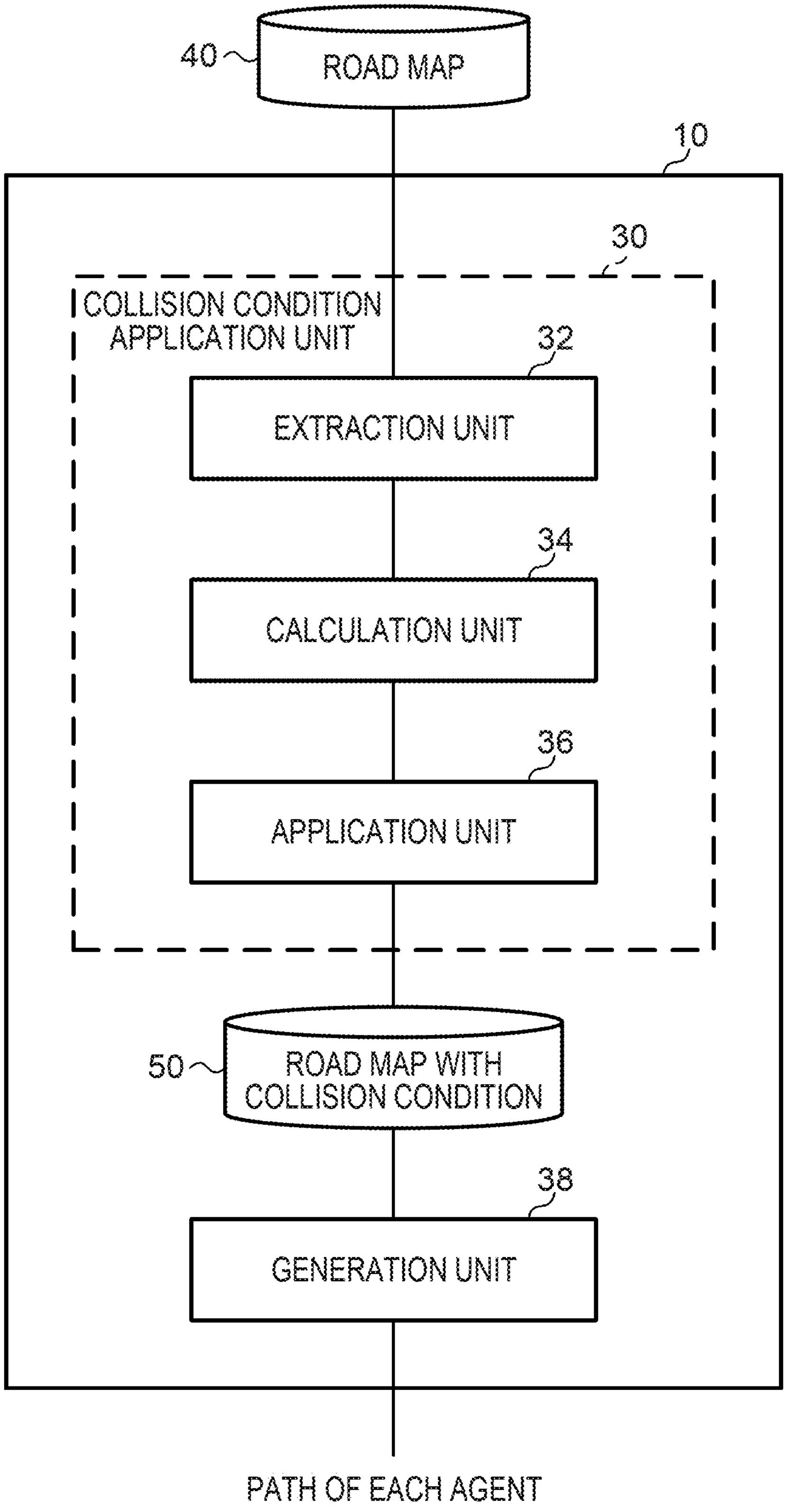
FIG. 2 is a block diagram illustrating an example of functional components of the path generation device.

Next, functional components of the path generation device 10 according to the present embodiment are described. FIG. 2 is a block diagram illustrating an example of the functional components of the path generation device 10. As illustrated in FIG. 2, the path generation device 10 includes a collision condition application unit 30 and a generation unit 38 as the functional components. The collision condition application unit 30 further includes an extraction unit 32, a calculation unit 34, and an application unit 36. The collision condition application unit 30 is an example of a "collision condition application device" according to the disclosure. Each functional component is implemented by the CPU 12 reading the path generation program stored in the storage device 16, loading the program into the memory 14, and executing the program.

Figure 3:
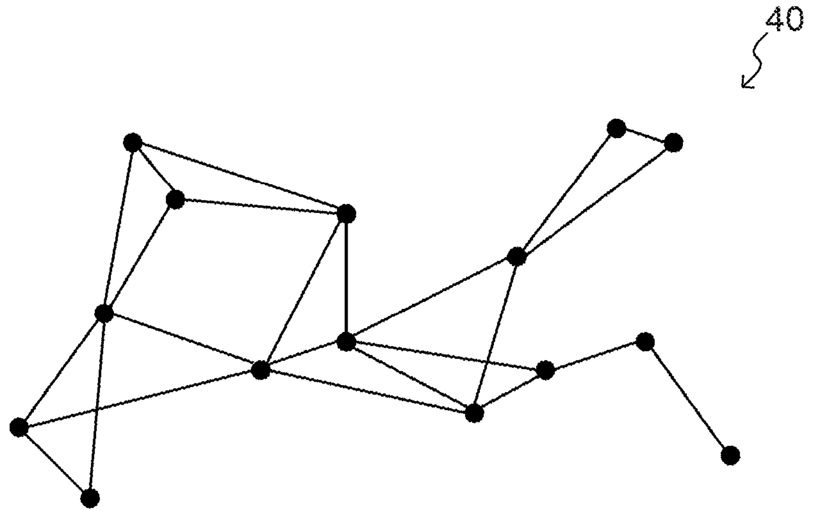
FIG. 3 is a diagram illustrating an example of a road map.

The collision condition application unit 30 acquires a road map 40. FIG. 3 is a diagram illustrating an example of the road map 40. As illustrated in FIG. 3, the road map 40 includes a plurality of vertices and a plurality of edges connecting the vertices. In FIG. 3, a black dot is the vertex, and a line segment connecting the vertices is the edge. As illustrated in FIG. 3, unlike a grid graph, the road map 40 is a plane graph in which lengths of the respective edges are not common, each vertex can take any position on a two-dimensional plane, and a case in which the edges intersect with each other is also allowed.

FIG. 4 is a diagram illustrating an example of a data configuration of the road map 40. In the example of FIG. 4, the road map 40 includes a vertex information table 42 and an edge information table 44. In the vertex information table 42, a vertex ID which is identification information of each vertex and position information of each vertex are stored in association with each other. In the edge information table 44, an edge ID which is identification information of each edge and the vertex IDs of the vertices corresponding to two end points of each edge are stored in association with each other.

The collision condition application unit 30 applies a collision condition (details are described below) to the acquired road map 40 and stores the road map 40 as a road map with collision condition 50. Hereinafter, the extraction unit 32, the calculation unit 34, and the application unit 36, which are the functional components of the collision condition application unit 30 that applies the collision condition to the road map 40, each are described.

Figure 5:
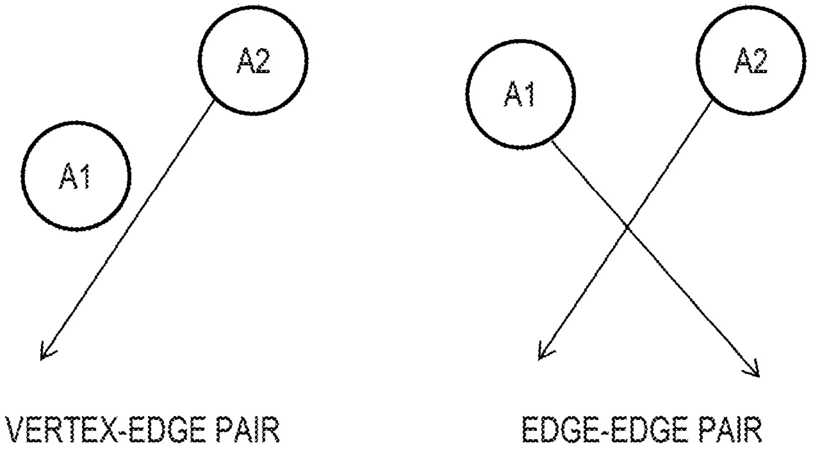
FIG. 5 is a diagram illustrating a vertex-edge pair and an edge-edge pair.

In a case in which a plurality of agents moves on the road map 40, the extraction unit 32 extracts a portion where it is likely that agents existing at the vertices or agents moving on the edges collide with each other. The extraction unit 32 extracts a pair of the vertex and the edge and a pair of the edges as illustrated in FIG. 5 as the portions where collisions are likely to occur. The pair of the vertex and the edge is an example of a "first pair" of the disclosure, and the pair of the edges is an example of a "second pair" of the disclosure. Hereinafter, the pair of the vertex and the edge is referred to as a "vertex-edge pair", and the pair of the edges is referred to as a "side-edge pair".

In the vertex-edge pair of FIG. 5, A1 represents an agent existing at a certain vertex, and A2 represents an agent starting to move from an end point of a certain edge. In this case, since the agent A2 moves along the edge and is likely to collide with the agent A1 existing at a certain vertex, such a vertex-edge pair is extracted as a portion where a collision is likely to occur. In the edge-edge pair of FIG. 5, A1 represents an agent starting to move from an end point of a certain edge, and A2 represents an agent starting to move from an end point of another edge. In this case, since the agents A1 and A2 move along the edges respectively and are likely to collide with each other, such an edge-edge pair is extracted as a portion where a collision is likely to occur.

Specifically, the extraction unit 32 extracts the vertex-edge pair and the edge-edge pair from among the plurality of vertices and the plurality of edges included in the road map 40 by using the following algorithm.

(1) an algorithm that lists pairs of points of which inter-point distances are a certain distance or shorter in a given set of points (2) an algorithm that lists points existing in a given area in a given set of points (3) an algorithm that lists pairs of line segments intersecting with each other in a given set of line segments For the above (1), Fixed-Radius Near Neighbors Algorithm or the like is known. This algorithm divides the points into buckets on a grid and calculates distances for pairs of points that are adjacent or in the same bucket. A time calculation amount of this algorithm is 0 (V+M). Here, V is the total number of points, and M is the number of pairs found.

For the above (2), Partition tree or the like is known. This algorithm facilitates area search by successfully recursively dividing a set of points in advance. As the algorithm of the above (2), there are various algorithms such as an algorithm in which pre-calculation is heavy but one query is light.

For the above (3), Bentley-Ottmann Algorithm or the like is known. This algorithm manages a line segment intersecting with a scanning line while performing planar scanning, and detects intersection. A time calculation amount of this algorithm is 0 ((E+M) log E). Here, E is the total number of line segments, and M is the number of pairs found.

More specifically, under the assumption that the road map 40 is on a two-dimensional plane, all the edges are line segments, and all the agents have circular shapes having the same radius r, the extraction unit 32 extracts the vertex-edge pair and the edge-edge pair by the following method. In the road map 40, a curve can be approximated by a line segment if many vertices are taken. A shape of the agent may be approximated by a larger circle to make the collision condition strict. Therefore, it is considered that the above assumption is not a practical problem.

The extraction unit 32 extracts, as the vertex-edge pair, a pair of a vertex and an edge that satisfies at least one of (i) a case in which a distance between at least one of end points of the edge and the vertex is less than 2r and (ii) a case in which a length of a perpendicular line drawn from the vertex to the edge is less than 2r. The pairs satisfying (i) and (ii) can be efficiently extracted by applying the algorithms of (1) and (2), respectively.

The extraction unit 32 extracts, as the edge-edge pair, a pair of edges that satisfies at least one of (i) a case in which a distance between at least one of end points of one edge and the other edge is less than 2r and (ii) a case in which the edges intersect with each other. The pairs satisfying (i) and (ii) can be efficiently extracted by applying the algorithms of (2) and (3), respectively.

The calculation unit 34 calculates a temporal condition under which a collision occurs between the agents existing at the vertex or agents moving on the edges, for each of the vertex-edge pair and the edge-edge pair extracted by the extraction unit 32.

Specifically, the calculation unit 34 calculates a time interval in which a collision between one agent and another agent occurs with respect to a difference between time at which one agent is present at the vertex of the vertex-edge pair and time at which another agent starts moving from an end point of the edge. The calculation unit 34 calculates a time interval in which a collision between one agent and another agent occurs with respect to a difference between time at which one agent starts moving from an end point of one edge of the edge-edge pair and time at which another agent starts moving from an end point of the other edge.

Figure 6:
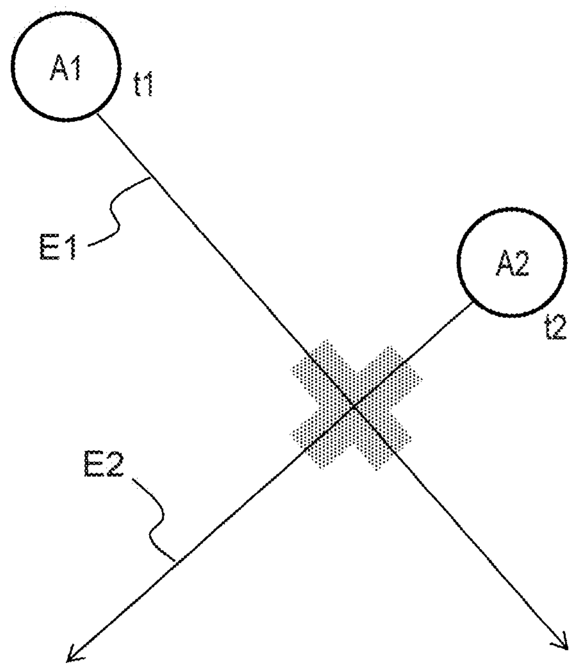
FIG. 6 is a diagram illustrating a time interval of a collision condition.

For example, as illustrated in FIG. 6, it is assumed that the agent A1 departs from an end point of an edge E1 at time t1, and the agent A2 departs from an end point of an edge E2 at time t2. In the case of the example of FIG. 6, a portion where the agent A1 moving on the edge E1 and the agent A2 moving on the edge E2 are likely to collide with each other is near intersection of the edge E1 and the edge E2 (shaded portion in FIG. 6). Whether the agent A1 and the agent A2 collide with each other depends on a difference between time t1 and time t2. For example, in the example of FIG. 6, in a case in which the agents A1 and A2 move at the same speed, when time t1 and time t2 are substantially the same time, the agents A1 and A2 do not collide with each other, that is, both agents pass each other. Meanwhile, in a case in which both agents reach a portion where a collision is likely to occur at the same time due to the time difference that time t2 is later than t1 by a predetermined time, a collision occurs.

In consideration of such a situation, the calculation unit 34 calculates a time interval from a to b in a case in which both agents collide with each other when the time difference between time t1 and time t2 (t1−t2) is within the range of the time interval from a to b. The calculation unit 34 calculates the time interval from a to b by applying, for example, the method of Collision Detection for Agents in Multi-Agent Pathfinding (Reference Literature 1).

Reference Literature 1: Thayne T. Walker, Nathan R. Sturtevant, "Collision Detection for Agents in Multi-Agent Pathfinding", moarXiv:1908.09707v3 [cs.R0], 15 Nov. 2019.

The application unit 36 generates, as the collision condition information, a tuple including the vertex ID of the vertex and the edge ID of the edge included in the vertex-edge pair, and the time interval calculated by the calculation unit 34 for the vertex-edge pair. Similarly, the application unit 36 generates, as the collision condition information, a tuple including the respective edge IDs of the two edges included in the edge-edge pair and the time interval calculated by the calculation unit 34 for the edge-edge pair. Then, the application unit 36 applies the generated set of tuples to the road map 40 and stores the set of tuples in a predetermined storage area of the path generation device 10 as the road map with collision condition 50.

Figure 7:
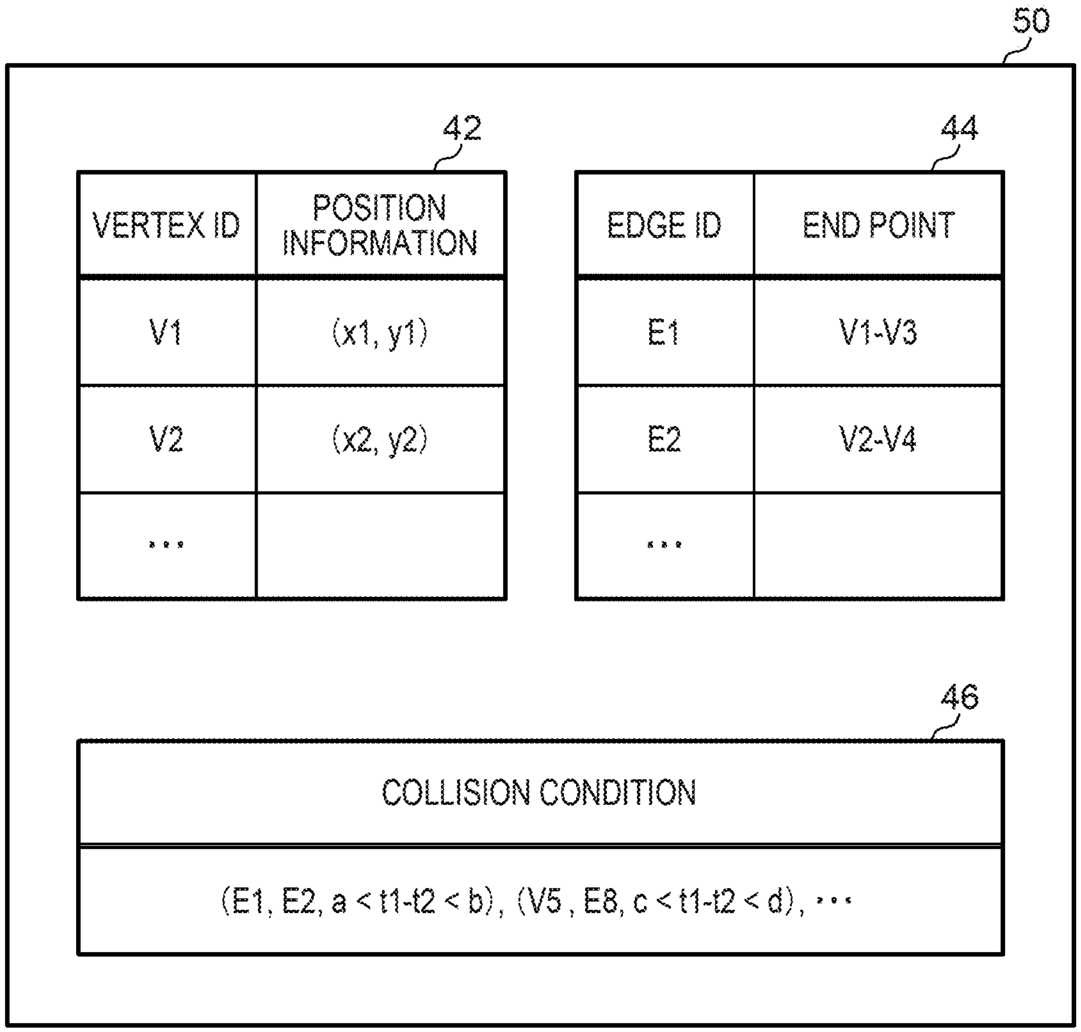
FIG. 7 is a diagram illustrating an example of a data configuration of a road map with collision condition.

FIG. 7 is a diagram illustrating an example of a data configuration of the road map with collision condition 50. In the example of FIG. 7, the road map with collision condition 50 is obtained by applying a collision condition 46 to the data configuration of the road map 40 illustrated in FIG. 4. In FIG. 7, a tuple (E1, E2, a<t1−t2<b) that is one of the collision conditions indicates that a time interval of a difference between the time t1 and the time t2 at which the agents depart from the respective end points of the edge E1 and the edge E2 of the edge-edge pair including the edges E1 and E2 is from a to b.

The generation unit 38 generates respective paths of the plurality of agents moving on the road map with collision condition 50. Specifically, the generation unit 38 generates a path in which time at which the agent is present at the vertex included in the path and time at which the agent starts to move from an end point of the edge are not included in the time interval of the collision condition. For example, as illustrated in FIG. 8, the generation unit 38 generates, as a path, a series of combinations of each vertex passing from the vertex serving as a start point to the vertex serving as a target point and the departure time from the vertex toward the next vertex for each agent.

More specifically, in the case of sequentially generating paths of agents one by one, the generation unit 38 generates the path of the first agent and then generates the path of the second agent. The generation unit 38 generates a path of each agent, for example, by using the A* algorithm. In this case, the generation unit 38 searches for the shortest path in the case of reaching the target point from the start point through a certain vertex and selects a vertex V of which shortest arrival time is already determined and an edge coming from the vertex V. The generation unit 38 acquires the collision condition including the selected vertex V and the edge coming from the vertex V from the collision condition applied to the road map with collision condition 50. In a case in which the corresponding collision condition is present, the generation unit 38 acquires the departure time from the end point of the selected edge among the previously generated paths of other agents. The generation unit 38 adjusts the departure time from the vertex V with the time interval included in the acquired collision condition as a constraint and obtains a candidate for the arrival time to a vertex at the end of tracing the edge. The generation unit 38 continues this processing until the shortest arrival time to the target point is determined and generates a path by backwards tracing the optimum edge from the target point based on the search history.

Figure 9:
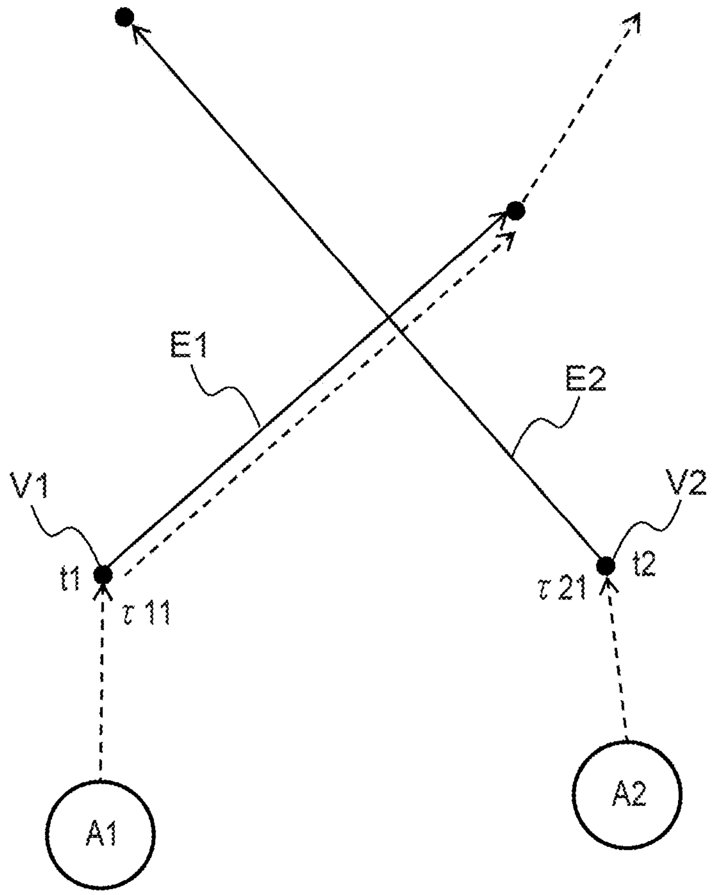
FIG. 9 is a diagram illustrating path generation using the collision condition including the time interval.

For example, as illustrated in FIG. 9, it is assumed that, for the agent A1, a path passing through the edge E1, which starts to move from the vertex V1 which is an end point of the edge E1 at time τ11 and moves along the edge E1, is generated. Next, in the generation of the path of the agent A2, it is assumed that the edge E2 that reaches the vertex V2 from a certain edge and has the vertex V2 as an end point is selected. It is assumed that the edges E1 and E2 are extracted as the edge-edge pair, and a collision condition of (E1, E2, a<t1−t2<b) is applied. In this case, the generation unit 38 generates a path that departs from the vertex V2 at time τ21 and moves along the edge E2 such that a<τ11−τ21<b is not satisfied. In a case in which the time τ21 that does not satisfy the time interval does not exist, or in a case in which such a time τ21 is employed, but waiting time of the agent at the vertex V2 is a predetermined time or more, the generation unit 38 reselects another edge having the vertex V2 as an end point. In addition, the generation unit 38 may also go back to the edge one before and reselect the next edge.

The generation unit 38 may employ an algorithm for generating a path by sequentially selecting the next edge from the start point as an algorithm for generating a path of each agent. Also in this case, when the edge is selected, the departure time may be adjusted based on the collision condition.

Figure 10:
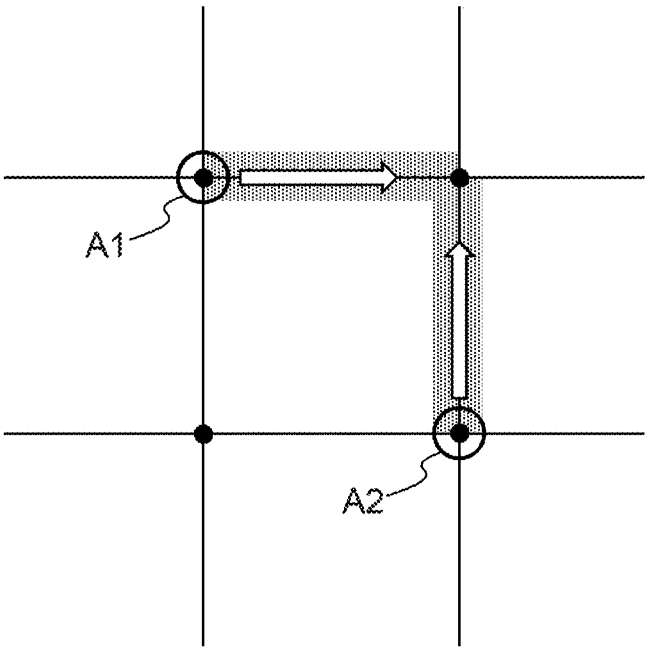
FIG. 10 is a diagram illustrating path generation in a case in which the collision condition does not include the time interval.

Here, with reference to FIG. 10, a case in which the time interval is not included in the collision condition and the path generation is performed by using the grid graph under discrete time is described. In a case in which the moving directions of the agent A1 and the agent A2 at certain time t are the directions indicated by the arrows, in order to avoid a collision between both agents, the shaded portion in FIG. 10 serves as a constraint at the time of path generation as a portion where a collision is likely to occur.

Figure 11:
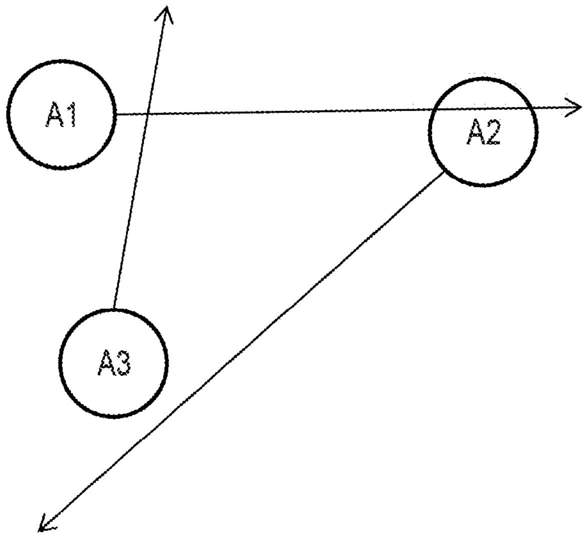
FIG. 11 is a diagram illustrating an example in which a deadlock occurs.

As in the invention described in JP-A No. H10-312217, a path plan or the like using a Petri net model does not indicate a temporal condition at a collision portion, and a portion where even a slight collision occurs is prohibited from being used at the same time. In such a case, it is estimated that a collision is more likely to occur than in practice, and an increase in calculation cost of path generation or a deadlock as illustrated in FIG. 11 may be caused.

Meanwhile, in the present embodiment, by including the time interval in the collision condition, a part prohibited from being used at the same time in the portion where a collision is likely to occur can be set to the minimum necessary range as illustrated in FIG. 6. Therefore, since a space of the solution (path) to be searched for increases, and the opportunity to find the solution increases, the success rate of path generation increases, and also the calculation cost for path generation can be reduced.

Figure 12:
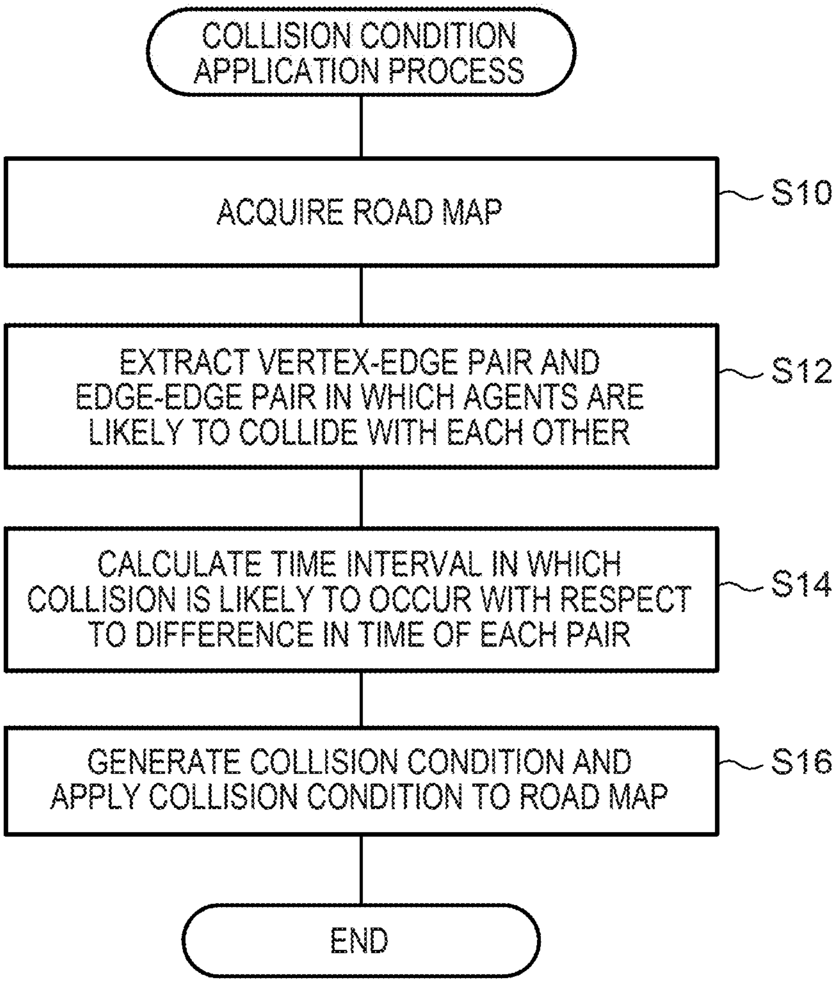
FIG. 12 is a flowchart illustrating a flow of a collision condition application process.
Figure 13:
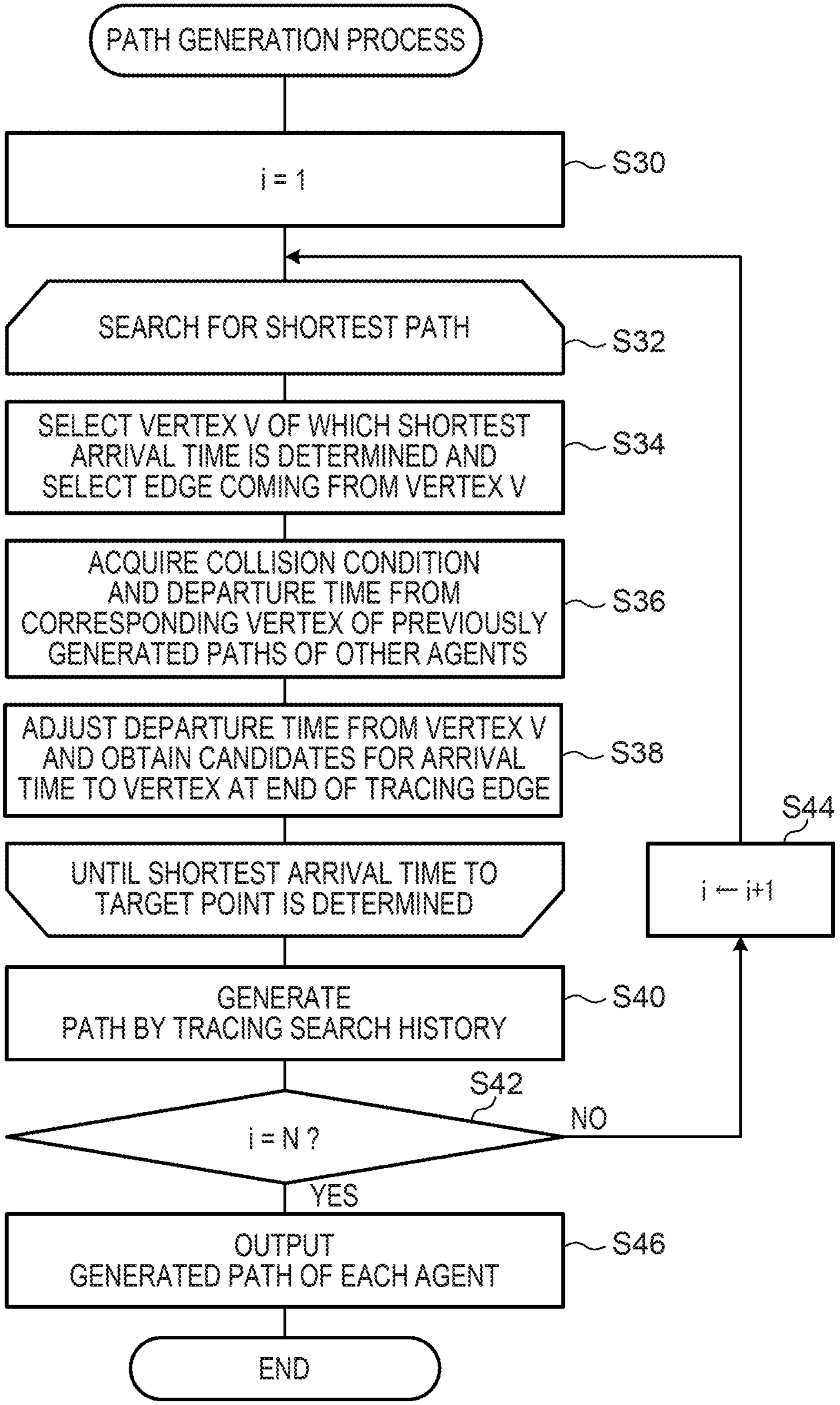
FIG. 13 is a flowchart illustrating a flow of a path generation process.

Next, an operation of the path generation device 10 according to the present embodiment is described. FIG. 12 is a flowchart illustrating a flow of the collision condition application process performed by the CPU 12 of the path generation device 10. FIG. 13 is a flowchart illustrating a flow of the path generation process performed by the CPU 12 of the path generation device 10. The CPU 12 reads the path generation program from the storage device 16, loads the program into the memory 14, and executes the program, whereby the CPU 12 functions as each functional component of the path generation device 10, and the collision condition application process illustrated in FIG. 12 and the path generation process illustrated in FIG. 13 are performed. Hereinafter, the collision condition application process and the path generation process each are described in detail.

First, the collision condition application process illustrated in FIG. 12 is described.

In step S10, the extraction unit 32 acquires the road map 40. Next, in step S12, in a case in which the plurality of agents moves on the road map 40, the extraction unit 32 extracts the vertex-edge pair and the edge-edge pair as portions where it is likely that agents existing at the vertices or agents moving on the edges collide with each other.

Next, in step S14, the calculation unit 34 calculates a time interval in which a collision between both agents occurs with respect to a difference between time at which one agent is present at the vertex of the vertex-edge pair and time at which another agent starts moving from an end point of the edge. The calculation unit 34 calculates a time interval in which a collision between both agents occurs with respect to a difference between time at which one agent starts moving from an end point of one edge of the edge-edge pair and time at which another agent starts moving from an end point of the other edge.

Next, in step S16, the application unit 36 generates, as the collision condition information, a tuple including the vertex ID of the vertex and the edge ID of the edge of the vertex-edge pair, and each of the two edge IDs of the edge-edge pair, and the calculated time interval. Then, the application unit 36 applies the generated set of tuples to the road map 40 and stores the set of tuples in a predetermined storage area of the path generation device 10 as the road map with collision condition 50, and the collision condition application process ends.

Next, the path generation process illustrated in FIG. 13 is described. Here, it is assumed that Ai (i=1, 2, . . . , and N, N is the number of agents) is applied to each agent as an agent ID.

In step S30, the generation unit 38 sets 1 to the variable i for specifying the agent ID. Next, in a loop process of step S32, the shortest path in the case of reaching the target point from the start point of the agent Ai through a certain vertex is searched for by using the road map with collision condition 50. Specifically, in step S34, the generation unit 38 selects the vertex V of which the shortest arrival time is already determined and the edge coming from the vertex V.

Next, in step S36, the generation unit 38 acquires the collision condition including the selected vertex V and the edge coming from the vertex V from the collision condition applied to the road map with collision condition 50. The generation unit 38 acquires departure time t1 from the end point of the edge included in the acquired collision condition among the previously generated paths of other agents.

Next, in step S38, the generation unit 38 adjusts departure time t2 at which the agent Ai departs from the vertex V so that the difference from the acquired departure time t1 of another agent is out of the time interval included in the acquired collision condition, and obtains a candidate for the arrival time to the vertex at the end of tracing the edge. In a case in which adjustable time does not exist, the process returns to step S34, and the generation unit 38 reselects the vertex V and the edge coming from the vertex V. The generation unit 38 repeats the processes of steps S34 to S38 until the shortest arrival time to the target point is determined. In a case in which the shortest arrival time to the target point is determined, the loop process of step S32 ends, and the process proceeds to step S40. In step S40, the generation unit 38 generates a path by backwards tracing the optimum edge from the target point based on the search history.

Next, in step S42, the generation unit 38 determines whether i becomes N, which is the number of agents. In a case in which i=N, the process proceeds to step S46, and in a case in which i≠N, the process proceeds to step S44. In step S44, the generation unit 38 increments i by 1, and the process returns to step S32. In step S46, the generation unit 38 outputs the path of each agent generated in step S40, and the path generation process ends.

As described above, in the path generation device according to present the embodiment, in a case in which the plurality of agents moves on the road map, the collision condition application unit extracts the vertex-edge pair and the edge-edge pair in which agents are likely to collide with each other. The collision condition application unit calculates a time interval in which a collision between both agents occurs with respect to a difference between time at which one agent is present at the vertex of the vertex-edge pair and time at which another agent starts moving from an end point of the edge. The collision condition application unit calculates a time interval in which a collision between both agents occurs with respect to a difference between time at which one agent starts moving from an end point of one edge of the edge-edge pair and time at which another agent starts moving from an end point of the other edge. Then, the collision condition application unit applies a collision condition in which IDs of the vertices and the edges included in each pair are associated with the calculated time interval to the road map. As described above, a road map in which a collision condition including a time interval is applied to a portion where a collision is likely to occur is prepared in advance, so that a path in continuous time of a multi-agent on the road map can be generated in a short period of time.

It is possible to estimate a portion where a collision occurs to the minimum by including the time interval in the collision condition. Therefore, since a space of the solution (path) to be searched for increases, and the opportunity to find the solution increases, the success rate of path generation increases, and also the calculation cost for path generation can be reduced.

In the current situation, a method of generating a path by an algorithm that requires only collision determination such as continuous conflict based search (CCBS) by dividing an environment into grids, using a planning algorithm specialized for the grid, and using a road map made by a human hand or a road map obtained by some methods is considered. The former method is difficult to apply in a case in which the shape of the environment is difficult to express with a grid. Since an algorithm generally known as the latter method does not have a realistic guarantee of a time calculation amount, there is a case in which it takes time to generate a path.

By applying a collision condition including a time interval to the road map as in the present embodiment, a path can be obtained by using an algorithm having a small time cost such as prioritized safe interval path planning (PSIPP) for various road maps.

In the present embodiment, when the collision condition application unit extracts a portion where a collision is likely to occur, the vertex-edge pair and the edge-edge pair, which are the corresponding portions, can be efficiently extracted by using an existing algorithm.

Here, experimental results obtained by comparing a method of the present embodiment (hereinafter, referred to as "present method") with a comparative method are described. In this experiment, the MAPF problem on a road map constructed by the well-known method probabilistic road map (PRM) on the environment having an obstacle was solved. CCBS, which is an existing method, and PSIPP using a road map to which a collision condition including a time interval is not applied were set as comparative methods.

Figure 14:
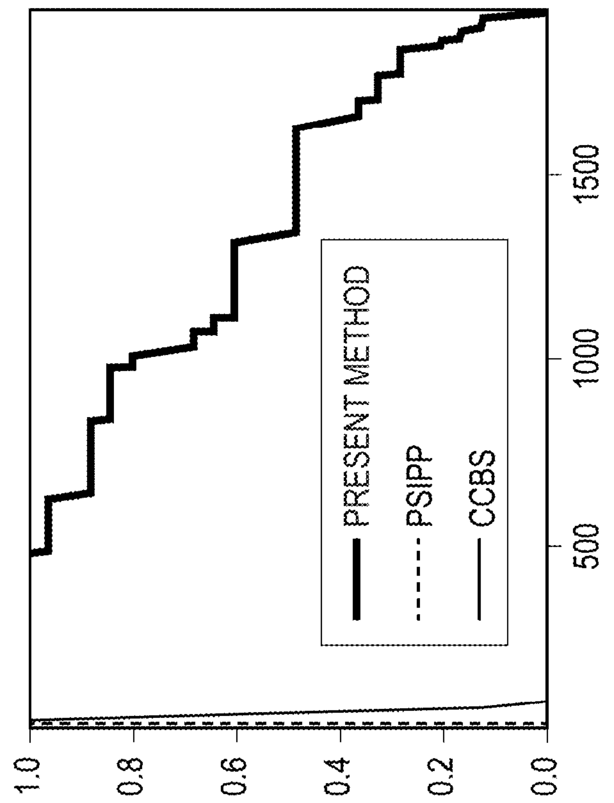
FIG. 14 is a graph illustrating experimental results obtained by comparing the present method with a comparative method.
Figure 14:
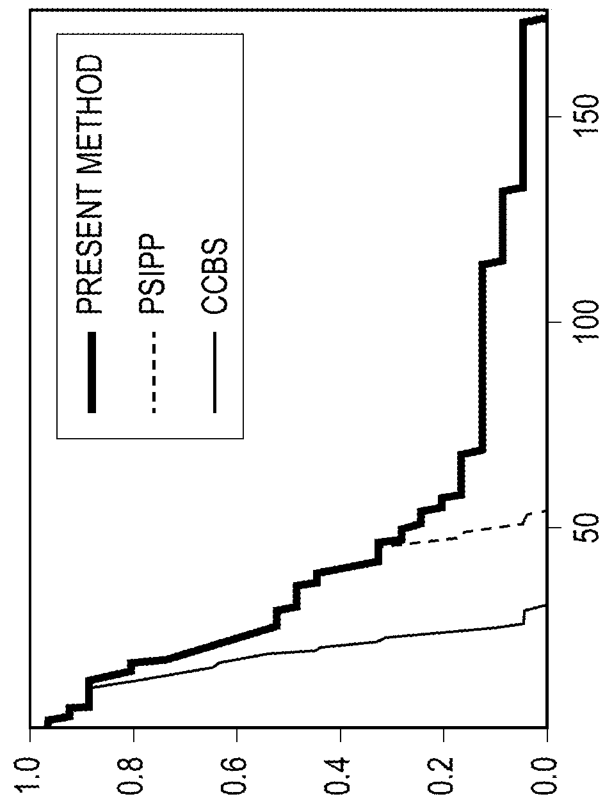

FIG. 14 is a graph of a success rate of path generation (planning), and the horizontal axis represents the number of agents. The left graph shows experimental results in an environment having an obstacle, and the right graph shows experimental results in an environment having no obstacles. In the comparative method, planning for several tens of agents was limited, but in the present method, planning for 100 or more agents was successful. In an environment having no obstacles, planning for close to 2,000 agents was successful under the time limit of 30 seconds.

The disclosure can be applied to calculation of safe paths of a large number of robots in a short period of time in a situation where the robots move for work such as transportation, watching, and cleaning of articles in a predetermined place such as a factory and a warehouse.

Although the configuration in which the path generation device includes the collision condition application unit is described in the above embodiment, the collision condition application device including the functional component of the collision condition application unit and the path generation device including the generation unit may be implemented by different devices. In this case, a road map with collision condition output from the collision condition application device may be used in a path generation device to which a method other than PSIPP is applied or may be used for purposes other than path generation.

In the above embodiment, the description has been given on the assumption that the sizes of all the agents are the same, but the sizes of the agents may be different from each other. In this case, the radius of the circumscribed circle of the agent having the largest size may be used as the radius r of the agent used at the time of extracting the vertex-edge pair and the edge-edge pair.

The speed of the agent may not be constant, and acceleration/deceleration may be performed under a certain determined speed limit and acceleration limit for each agent and each edge. In this case, comparison with the time interval included in the collision condition may be performed in consideration of the acceleration/deceleration of the agent.

The collision condition application process and the path generation process performed by the CPU reading software (program) in the above embodiment may be performed by various processors other than the CPU. Examples of the processor in this case include a programmable logic device (PLD) in which a circuit configuration can be changed after manufacturing a field-programmable gate array (FPGA) or the like, and a dedicated electric circuit that is a processor having a circuit configuration exclusively designed for performing specific processes such as an application specific integrated circuit (ASIC). The collision condition application process and the path generation process may be performed by one of these various processors or may be performed by a combination of two or more processors of the same type or different types (for example, a plurality of FPGAs and a combination of a CPU and an FPGA). More specifically, the hardware structure of these various processors is an electric circuit in which circuit elements such as semiconductor elements are combined.

In the above embodiment, the aspect in which the path generation program is stored (installed) in the storage device in advance is described, but the disclosure is not limited thereto. The program may be provided in a form of being stored in a storage medium such as a CD-ROM, a DVD- ROM, a Blu-ray disc, or a USB memory. The program may have a form of being downloaded from an external device via a network.

What is claimed is:

1. A collision condition application device, comprising:
a memory; and
a processor coupled to the memory, the processor being configured to execute processing, the processing including:
in a case in which a plurality of agents move on a road map including a plurality of vertices and a plurality of edges connecting the plurality of vertices, extracting
i) a first pair consisting of one vertex selected from the plurality of vertices and one edge selected from the plurality of edges along which there is a possibility of a first agent that exists at the one vertex and the second agent that moves along the one edge colliding with each other, and
ii) a second pair consisting of two edges selected from the plurality of edges on which there is a possibility of a third agent that moves along one of the two edges and a fourth agent that moves along the other of the two edges colliding with each other;
calculating
i) a time interval a to b when the first agent and the second agent collision when the difference between time t1 when the first agent is at the vertex of the first pair and time t2 when the second agent starts to move from an end point of the edge of the first pair is within the range of the time interval a to b, and
ii) a time interval c to d when the third agent and the fourth agent collision when the difference between time t3 when the third agent starts to move from an end point of one edge of the second pair and time t4 when the fourth agent starts to move from an end point of the other edge of the second pair is within the range of the time interval c to d; and
applying, to the road map,
i) information obtained by associating identification information of the vertices and the edges included in the first pair with the time interval a to b, and
ii) information obtained by associating identification information of each of the two edges included in the second pair with the time interval c to d, as a condition in which a collision between agents occurs.

2. The collision condition application device of claim 1, wherein the extraction unit extracts the first pair and the second pair by using an algorithm that lists pairs of points, among a given set of points, each pair having an inter-point distance[s] equal to or less than a predetermined distance, an algorithm that lists points present in a given area among a given set of points, and an algorithm that lists pairs of line segments intersecting with each other among a given set of line segments.

3. The collision condition application device of claim 1, wherein, in a case in which an agent is assumed to be a circle having a diameter of a predetermined value,
extracting a pair of a vertex and an edge that satisfies at least one of i) and ii) from the plurality of vertices and the plurality of edges, as the first pair;
i) a case in which a distance between at least one of the end points of a edge and a vertex is less than the predetermined value,
ii) a case in which a length of a perpendicular line drawn from a vertex to a edge is less than the predetermined value; and
extracting a pair of edges that satisfies at least one of iii) and iv) from the plurality of edges, as the second pair;
iii) a case in which a distance between at least one of the end points of one edge and the other edge is less than the predetermined value,
iv) a case in which edges intersect with each other.

4. A path generation device comprising: the collision condition application device of claim 1; and generating a path of each of the plurality of agents moving on the road map to which a condition in which the plurality of agents collide with each other is applied by the collision condition application device, in which a time at which an agent is present at a vertex included in the path and a time at which the agent starts to move from an end point of an edge are not included in a time interval of the condition.

5. The path generation device of claim 4, wherein, in a case in which paths of the plurality of agents are sequentially generated one by one, generating a path, in which a first path for agent A is generated first, and then, when a second path for agent B is generated, the second path is generated so as to satisfy conditions i) and ii);
i) the difference between the time ta when one of agent A and agent B exists at the vertex of the first pair included in the first path and the time tb when the other of agent A and agent B starts moving from the end point of the edge of the first pair included in the first path is not included in the time interval a to b,
ii) the difference between the time tc when one of agent A and agent B starts moving from the end point of one edge of the second pair included in the first path and the time td when the other of agent A and agent B starts moving from the end point of the other edge of the second pair included in the first path is not included in the time interval c to d.

6. A collision condition application method, comprising:
in a case in which a plurality of agents move on a road map including a plurality of vertices and a plurality of edges connecting the plurality of vertices,
extracting
i) a first pair consisting of one vertex selected from the plurality of vertices and one edge selected from the plurality of edges along which there is a possibility of a first agent that exists at the one vertex and the second agent that moves along the one edge colliding with each other, and
ii) a second pair consisting of two edges selected from the plurality of edges on which there is a possibility of a third agent that moves along one of the two edges and a fourth agent that moves along the other of the two edges colliding with each other;
calculating
i) a time interval a to b when the first agent and the second agent collision when the difference between time t1 when the first agent is at the vertex of the first pair and time t2 when the second agent starts to move from an end point of the edge of the first pair is within the range of the time interval a to b, and
ii) a time interval c to d when the third agent and the fourth agent collision when the difference between time t3 when the third agent starts to move from an end point of one edge of the second pair and time t4 when the fourth agent starts to move from an end point of the other edge of the second pair is within the range of the time interval c to d; and
applying, to the road map, i) information obtained by associating identification information of the vertices and the edges included in the first pair with the time interval a to b, and ii) information obtained by associating identification information of each of the two edges included in the second pair with the time interval c to d, as a condition in which a collision between agents occurs, by an application unit.

7. A collision condition application program for causing a computer to function to:

in a case in which a plurality of agents move on a road map including a plurality of vertices and a plurality of edges connecting the plurality of vertices, extract i) a first pair consisting of one vertex selected from the plurality of vertices and one edge selected from the plurality of edges along which there is a possibility of a first agent that exists at the one vertex and the second agent that moves along the one edge colliding with each other, and ii) a second pair consisting of two edges selected from the plurality of edges on which there is a possibility of a third agent that moves along one of the two edges and a fourth agent that moves along the other of the two edges colliding with each other;

calculate i) a time interval a to b when the first agent and the second agent collision when the difference between time t1 when the first agent is at the vertex of the first pair and time t2 when the second agent starts to move from an end point of the edge of the first pair is within the range of the time interval a to b, and ii) a time interval c to d when the third agent and the fourth agent collision when the difference between time t3 when the third agent starts to move from an end point of one edge of the second pair and time t4 when the fourth agent starts to move from an end point of the other edge of the second pair is within the range of the time interval c to d; and apply, to the road map, i) information obtained by associating identification information of the vertices and the edges included in the first pair with the time interval a to b, and ii) information obtained by associating identification information of each of the two edges included in the second pair with the time interval c to d, as a condition in which a collision between agents occurs.

* * * * *